United States Patent [19]

Betz et al.

[11] Patent Number: 4,686,205

[45] Date of Patent: Aug. 11, 1987

[54] INTAKE LIMITING FEED FOR ANIMALS CONTAINING SUCROSE OCTAACETATE

[75] Inventors: Norman L. Betz, Ballwin; Larry W. Degoey, Ellisville, both of Mo.

[73] Assignee: Ralston Purina Company, St. Louis, Mo.

[21] Appl. No.: 511,597

[22] Filed: Jul. 7, 1983

[51] Int. Cl.4 ............................................... A61K 31/70
[52] U.S. Cl. ....................................... 514/25; 536/119
[58] Field of Search ........................... 424/180; 514/25

[56] References Cited

U.S. PATENT DOCUMENTS 2,893,990  7/1959  Hass et al. .......................... 424/180
4,304,768  12/1981  Staub et al. ........................ 424/180

Primary Examiner—Johnnie R. Brown
Assistant Examiner—Elli Peselev
Attorney, Agent, or Firm—Virgil B. Hill

[57] ABSTRACT

A feed composition which limits the feed intake for animals, preferably swine, is disclosed which comprises grain or other feed materials and an intake limiting amount of a saccharide ester, preferably a saccharide ester selected from the group consisting of sucrose octaacetate, naringin, phenylglucopyranose, benzylglucopyranose, tetramethylglucose and glucose pentaacetate.

7 Claims, No Drawings

INTAKE LIMITING FEED FOR ANIMALS CONTAINING SUCROSE OCTAACETATE

BACKGROUND OF THE INVENTION

This invention relates to a feed composition which limits feed intake by animals, preferably swine, and a process for employing the same in order to obtain an economical and efficient means for the free choice feeding of animals.

In the feeding of animals, particularly swine, it is often very advantageous from the standpoint of economics as well as convenience for the animal to be self fed which means that the animals are offered a feed supplement or feed ration on a free choice basis without the periodic feeding of a rationed amount by a farmer or rancher each day. A disadvantage however of self feeding any typ of animal is that they frequently tend to over eat feed supplements or feed rations and consequently get a higher intake of feed ration than is necessary for the proper level of weight gain or weight maintenance. This results in an additional and unnecessary expense to the farmer in providing unnecessary amounts of protein or feed to the animal.

It would therefore be desirable to limit the intake of feed for animals such as swine, particularly only to the amount that is needed for weight gain or weight maintenance without consumption of more than is required for this purpose. U.S. Pat. No. 4,117,170 describes the use of sulfur as an appetite depressant or feed intake limiter for swine. A number of other compositions have been proposed for the intake limitation of various species of animals although these have principally been directed to the self feeding of cattle. U.S. Pat. No. 3,669,676 for example, describes a feed intake limiting composition for cattle which comprises a mixture of fish oil, ammonium sulfate, diammonium phosphate and meat meal. U.S. Pat. No. 4,197,319 describes a composition for limiting the feed supplement intake of ruminants which includes oleoresin capsicum in addition to meat meal and a salt.

While all of these compositions have proven to be extremely desirable and effective as intake limiters, nevertheless, a continuing need exist for other limiters which will effectively control the intake of animals such as swine and accordingly, this has necessitated the development of the feed intake limiting composition of the present invention.

It is therefore an object of the present invention to provide a feed supplement or feed composition which is self limiting insofar as feed intake when fed to an animal.

It is a more specific object of the present invention to develop a feed supplement or feed composition which can be eaten by animals such as swine on a free choice basis without over consumption by the animal.

It is a still further object of the present invention to provide a feed supplement or feed composition which provides a convenient and economical means of limiting the feed supplement intake in swine.

It is a still further object of the present invention to provide a method of controlling the feed intake of swine by the use of a feed composition containing an effective amount of a new feed intake limiting material.

SUMMARY OF THE INVENTION

The feed composition of the present invention having intake limiting properties for animals such as swine comprises grain or other feed materials and preferably an additional quantity of nutritionally balancing ingredients such as fat, minerals and vitamins wherein said composition includes a saccharide ester in an amount effective to limit the intake of the feed when fed to animals on a free choice basis. The saccharide ester is highly effective in controlling intake of the feed composition by animals such as swine and preferably is selected from the group of saccharide esters consisting of sucrose octaacetate, naringen, phenylglucopyranose, benzylglucopyranose, tetramethylglucose and glucose pentaacetate.

The use of the feed composition containing an effective amount of a saccharide ester provides a feed which is suitable for free choice feeding and eliminates an extensive amount of manual labor required to provide rationed or periodic feeding of the ration to the animal.

DESCRIPTION OF THE PREFERRED EMBODIMENTS

In accordance with the present invention, a feed composition has been developed which is capable of limiting intake of the feed to a predetermined amount that is necessary for the proper weight maintenance of animals such as swine. The present invention is not intended to be limiting by the exact extent or degree to which the composition of the present invention will limit the intake of animals such as swine and this will vary greatly depending upon environmental or other factors unrelated to the composition of the present invention. Typical levels of intake control for the composition of the present invention however, relative to its use in the self feeding of swine is between about 3 to 6 pounds of the feed composition per head of swine per day with a preferred range of between about 4 to 5 pounds of feed per head of swine per day. These amounts represent typical but non-limiting amounts of intake necessary for proper weight maintenance as well as most efficient feed utilization by the animal.

The feed composition or supplement of the present invention comprises grain as well as other nutritionally balancing ingredients including fat, minerals and vitamins together with an intake limiting amount of a saccharide ester to provide the feed composition with intake limiting properties when the feed composition is fed to animals such as swine. The saccharide esters employed as the active ingredient in the intake limitation of animals such as swine are preferably selected from the group consisting of sucrose octaacetate, naringen, phenylglucopyranose, benzylglucopyranose, tetramethylglucose and glucose pentaacetate. The most preferred saccharide ester for use in the feed composition or supplement of the present invention is sucrose octaacetate. These materials effectively contribute to the intake limiting properties of the feed composition and provide a consistent degree of feed intake limitation for swine under widely varying conditions.

The feed supplement or feed composition will contain a saccharide ester in an amount effective to limit the intake of the supplement or feed to animals such as swine and preferably, the composition will contain the saccharide ester in an amount of at least about 0.1% by weight of the feed composition and most preferably between about 0.2 and 0.5% by weight of the feed composition.

It is not intended to limit the present invention by the exact composition of the feed supplement or feed which contains an effective amount of the saccharide ester for intake limitation since the aspects of feed formulation and nutritional balancing thereof are well within the knowledge and skill of the art. For purposes of a complete disclosure of the present invention, however, the feed supplement or feed composition to which the intake limiting composition of the present invention may be added can be any feed material or composition which is generally intended to provide the full nutritional requirements of the animal with the exception of, as in the case of ruminants, the various roughage sources or other items that may be fed to the animal and are considered to be necessary for proper nutrition. Therefore, the feed composition to which the intake limiting amount of the saccharide ester of the present invention is added may consist of various grains which can be predominantly farinaceous or proteinaceous in nature as the case may be. Included among the suitable proteinaceous materials for use in fomulation of the feed composition are vegetable proteins such as soybeans, cottonseed, or peanuts. These are considered to be highly utilizable and available sources of protein for animals. Likewise, various farinaceous materials which contain a lower percentage of protein but additionally contribute to the protein requirement of the feed supplement or ration may also be employed among which are grains such as corn, milo, alfalfa or various wheat materials or other wheat by-products if desired. The feed supplement or composition will also include additional amounts of nutritionally balancing ingredients such as vitamins and minerals or fats and the exact amount or type of these materials are well within the knowledge of those skilled in the art of feed formulation. A further ingredient which may be employed in the present invention if desired are various medicaments or other additives to the feed composition either for purposes of disease control or improving performance. Materials of this type include additives such as antibiotics, bacteriostats, hormones and the like.

It is also not critical to the practice of the present invention whether the feed composition containing the intake limiting amount of saccharide ester is formed into pellets or cubes and fed in this form or otherwise fed to the animals in meal form on a free choice basis. The feed supplement of the present invention provides an effective means of self feeding animals such as swine while maintaining proper weight control during feeding yet avoiding a substantial amount of over consumption of the feed by the animal.

The following examples represent specific but non-limiting embodiments of the present invention.

EXAMPLE 1

To evaluate the intake limiting characteristics of the feed composition of the present invention, a total of 6 pigs were offered the following feed compositions on a free choice basis for a period of 5 days.

| Ingredient | Control % by Weight | Test Feed Composition % by Weight |
|---|---|---|
| Ground Corn | 68.1 | 67.96 |
| Wheat Midds | 15.0 | 15.0 |
| Soybean Meal | 8.8 | 8.8 |
| Meat Meal | 4.2 | 4.2 |
| Calcium Carbonate | 0.3 | 0.3 |
| Salt | 0.5 | 0.5 |
| Molasses | 3.0 | 3.0 |
| Vitamins & Minerals | 0.1 | 0.1 |
| Sucrose Octaacetate | — | 0.14 |

Consumption of both the control and test feed composition was measured. The average intake of the control was 6.38 lb of feed per animal per day. The average intake of the test composition was 5.88 lb of feed per animal per day.

EXAMPLE 2

To evaluate the intake limiting characteristics of the feed composition of the present invention, the following two test feed compositions were each compared to a control sample by being fed together with the control to a group of 6 pigs for a period of 5 days on a free choice basis.

| Ingredient | Control % by weight | Test Feed #1 % by weight | Test Feed #2 % by weight |
|---|---|---|---|
| Ground Corn | 68.1 | 67.9 | 67.7 |
| Wheat Midds | 15.0 | 15.0 | 15.0 |
| Soybean Meal | 8.8 | 8.8 | 8.8 |
| Meat Meal | 4.2 | 4.2 | 4.2 |
| Calcium Carbonate | 0.3 | 0.3 | 0.3 |
| Salt | 0.5 | 0.5 | 0.5 |
| Molasses | 3.0 | 3.0 | 3.0 |
| Vitamins & Minerals | 0.1 | 0.1 | 0.1 |
| Sucrose Octaacetate | — | 0.2 | 0.4 |

Consumption of the test feeds as compared to the control feed was measured. This data is set forth in Table 1 below.

TABLE 1

| Ingredient | Feed Intake (lb/animal/day) |
|---|---|
| Control | 4.4 |
| Test Feed #1 | 3.6 |
| Control | 5.4 |
| Test Feed #2 | 2.9 |

It is apparent that sucrose octaacetate significantly reduces the intake of the feed composition when fed on a free choice basis to animals such as swine.

These Examples are merely illustrative of the instant invention and it will be understood that various other changes in the details, materials or steps which have been described may be made without departing from the spirit of the instant disclosure.

What is claimed is:

1. A feed composition which limits the feed intake of animals comprising grain and sucrose octaacetate in an amount of at least about 0.1% by weight of said composition.

2. The feed composition of claim 1 wherein the amount of sucrose octaacetate is between about 0.2 and 0.5% by weight of said composition.

3. The feed composition of claim 1 wherein said composition includes a nutritionally balancing ingredient to provide a nutritionally balanced feed composition.

4. A method of self feeding animals by limiting feed intake to a predetermined amount which comprises feeding to said animals a feed comprising grain and sucrose octaacetate in an amount effective to limit intake of said composition.

5. The method of claim 4 wherein said effective amount is at least about 0.1% by weight of said composition.

6. The method of claim 4 wherein said effective amount is between about 0.2 and 0.5% by weight of said composition.

7. The method of claim 4 wherein said animals are swine.

* * * * *